(12) United States Patent　　　(10) Patent No.:　　US 9,542,315 B2
Strumpen et al.　　　　　　　　　(45) Date of Patent:　　*Jan. 10, 2017

(54) TILED STORAGE ARRAY WITH SYSTOLIC MOVE-TO-FRONT ORGANIZATION

(71) Applicant: INTERNATIONAL BUSINESS MACHINES CORPORATION, Armonk, NY (US)

(72) Inventors: Volker Strumpen, Austin, TX (US); Matteo Frigo, Lexington, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/917,126

(22) Filed: Jun. 13, 2013

(65) Prior Publication Data

US 2013/0275676 A1　　Oct. 17, 2013

Related U.S. Application Data

(63) Continuation of application No. 12/270,132, filed on Nov. 13, 2008, now Pat. No. 8,527,726.

(51) Int. Cl.
*G06F 12/00*　　(2006.01)
*G06F 12/08*　　(2016.01)
(Continued)

(52) U.S. Cl.
CPC ......... *G06F 12/0811* (2013.01); *G06F 3/0689* (2013.01); *G06F 12/0897* (2013.01); *G06F 12/123* (2013.01); *G06F 2212/271* (2013.01)

(58) Field of Classification Search
CPC . G06F 3/0689; G06F 12/123; G06F 2212/271
(Continued)

(56) References Cited

U.S. PATENT DOCUMENTS 5,339,268 A　　8/1994　Machida
5,355,345 A　　10/1994　Dickinson et al.
(Continued)

OTHER PUBLICATIONS

Akioka, et al. "Ring Data Location Prediction Scheme for Non-Uniform Cache Architectures," International Conference on Computer Design, 2008, pp. 693-698, Piscataway, US.
(Continued)

*Primary Examiner* — Prasith Thammavong
(74) *Attorney, Agent, or Firm* — Mitch Harris, Atty at Law, LLC; Andrew M. Harris; William J. Stock

(57) ABSTRACT

A tiled storage array provides reduction in access latency for frequently-accessed values by re-organizing to always move a requested value to a front-most storage element of array. The previous occupant of the front-most location is moved backward according to a systolic pulse, and the new occupant is moved forward according to the systolic pulse, preserving the uniqueness of the stored values within the array, and providing for multiple in-flight access requests within the array. The placement heuristic that moves the values according to the systolic pulse can be implemented by control logic within identical tiles, so that the placement heuristic moves the values according to the position of the tiles within the array. The movement of the values can be performed via only next-neighbor connections of adjacent tiles within the array.

20 Claims, 8 Drawing Sheets

(51) Int. Cl.
  *G06F 12/12* (2016.01)
  *G06F 3/06* (2006.01)
(58) Field of Classification Search
  USPC .......................................................... 711/165
  See application file for complete search history.

(56) References Cited

U.S. PATENT DOCUMENTS

| | | |
|---|---|---|
| 5,539,893 A | 7/1996 | Thompson et al. |
| 5,640,339 A | 6/1997 | Davis et al. |
| 6,370,620 B1 | 4/2002 | Wu et al. |
| 6,418,525 B1 | 7/2002 | Charney et al. |
| 6,430,654 B1 | 8/2002 | Mehrotra et al. |
| 6,763,426 B1 | 7/2004 | James et al. |
| 6,839,809 B1 | 1/2005 | Forster et al. |
| 6,961,821 B2 | 11/2005 | Robinson |
| 6,996,117 B2 | 2/2006 | Lee et al. |
| 7,050,351 B2 | 5/2006 | Halbert et al. |
| 7,107,399 B2 | 9/2006 | Bilardi et al. |
| 7,370,252 B2 | 5/2008 | Kim et al. |
| 7,461,210 B1 | 12/2008 | Wentzlaff et al. |
| 7,498,836 B1 | 3/2009 | Tuan |
| 7,805,575 B1 | 9/2010 | Agarwal et al. |
| 8,060,699 B2 | 11/2011 | Strumpen et al. |
| RE43,301 E | 4/2012 | Claassen |
| 8,364,895 B2 | 1/2013 | Strumpen |
| 8,370,579 B2 | 2/2013 | Strumpen |
| 8,527,726 B2 | 9/2013 | Strumpen et al. |
| 8,539,185 B2 | 9/2013 | Gebara et al. |
| 8,543,768 B2 | 9/2013 | Gebara et al. |
| 8,689,027 B2 | 4/2014 | Strumpen |
| 9,009,415 B2 | 4/2015 | Gebara et al. |
| 2002/0083266 A1 | 6/2002 | Reuter |
| 2002/0116579 A1 | 8/2002 | Goodhue et al. |
| 2002/0188781 A1 | 12/2002 | Schoch et al. |
| 2003/0033500 A1 | 2/2003 | Baxter et al. |
| 2003/0074505 A1 | 4/2003 | Andreas et al. |
| 2003/0128702 A1 | 7/2003 | Satoh et al. |
| 2003/0145239 A1 | 7/2003 | Kever et al. |
| 2003/0236961 A1 | 12/2003 | Qiu et al. |
| 2004/0148482 A1 | 7/2004 | Grundy et al. |
| 2005/0114618 A1 | 5/2005 | Lu et al. |
| 2005/0125702 A1 | 6/2005 | Huang et al. |
| 2005/0132140 A1 | 6/2005 | Burger et al. |
| 2005/0160132 A1 | 7/2005 | Van Doren et al. |
| 2006/0143384 A1 | 6/2006 | Hughes et al. |
| 2006/0212654 A1 | 9/2006 | Balakrishnan |
| 2007/0022309 A1 | 1/2007 | Adamo et al. |
| 2009/0178052 A1 | 7/2009 | Shen et al. |
| 2010/0057948 A1 | 3/2010 | Hemmi et al. |
| 2010/0064108 A1 | 3/2010 | Harris et al. |
| 2010/0122031 A1 | 5/2010 | Strumpen et al. |

OTHER PUBLICATIONS

Jin, et al. "A Domain-Specific On-Chip Network Design for Large Scale Cache Systems," 13th International Symposium on High-Performance Computer Architecture (HPCA-13), 2007, pp. 318-327, Phoenix, US.
Office Action in U.S. Appl. No. 12/270,132 mailed on May 23, 2012, 30 pages (pp. 1-30 in pdf).
Definition of "systole"; Retrieved from http://www.merriam-webster.com/dictionary/systolic on May 10, 2012, 2 pages (pp. 1-2 in pdf).
Final Office Action in U.S. Appl. No. 12/270,132 mailed on Nov. 28, 2012, 26 pages (pp. 1-26 in pdf).
Notice of Allowance in U.S. Appl. No. 12/270,132 mailed on Apr. 30, 2013, 16 pages (pp. 1-16 in pdf).
Office Action in U.S. Appl. No. 12/640,451 mailed on May 15, 2013, 17 pages (pp. 1-17 in pdf).
Office Action in U.S. Appl. No. 12/640,451 mailed on May 15, 2013.
U.S. Appl. No. 12/264,682, filed Nov. 4, 2008, Li, et al.
Bilardi et al., "Optimal Organizations for Pipelined Hierarchical Memories", SPAA '02, Aug. 2002, p. 109-116, Winnipeg, Manitoba, Canada.
Kwon et al., "A Scalable Memory System Design", 10th International Conference on VLSI Design, Jan. 1997, p. 257-260.
Kim et al., "An Adaptive, Non-Uniform Cache Structure for Wire-Delay Dominated On-Chip Caches", ASPLOS X, Oct. 2002, p. 211-222, San Jose, CA.
Baer et al., "On the Inclusion Properties for Multi-Level Cache Hierarchies", IEEE, Feb. 1988, p. 73-80.
Dickinson et al., "A Systolic Architecture for High Speed Pipelined Memories", IEEE, 1993, p. 406-409.
Beckmann et al., "Managing Wire Delay in Large Chip-Multiprocessor Caches", 37th Annual IEEE/ACM International Symposium on Microarchitecture, Dec. 2004, p. 319-330, Portland, OR.
Chishti et al., "Distance Associativity for High-Performance Energy-Efficient Non-Uniform Cache Architectures", 36th Annual IEEE/ACM International Symposium on Microarchitecture, Dec. 2003, 55-66, San Diego, CA.
Dybdahl et al., "An Adaptive Shared/Private NUCA Cache Partitioning Scheme for Chip Multiprocessors", 13th International Symposium on High Performance Computer Architecture, Feb. 2007, p. 2-12, Phoenix, AZ.
Foglia et al, "A NUCA Model for Embedded Systems Cache Design", 3rd IEEE Workshop on Embedded Systems for Real-Time Multimedia, Sep. 2005, p. 41-46, New York, NY.
Huh et al., "A NUCA Substrate for Flexible CMP Cache Sharing", International Conference on Supercomputing, Jun. 2005, p. 31-40, Boston, MA.
Muralimanohar et al., "Optimizing NUCA Organizations and Wiring Alternatives for Large Caches With CACTI 6.0", 40th Annual IEEE/ACM International Symposium on Microarchitecture, Dec. 2007, p. 3-14, Chicago, IL.
Abella et al., "Power Efficient Data Cache Designs", IEEE Computer Society, Oct. 2003, p. 3-8, San Jose, CA.
Gilbert et al., "Variable-Based Multi-Modual Data Caches for Clustered VLIW Processors", IEEE Computer Society, Sep. 2005, p. 3-13, St. Louis, MO.
Gonzales et al., "A Data Cache with Multiple Caching Strategies Tuned to Different Types of Locality", ACM, 1995, p. 338-347.
Lee et al., "Region-Based Caching: An Energy Delay Efficient Memory Architecture for Embedded Processors", Cases, 2000, p. 120-127.
Akioka, et al. "Ring data location prediction scheme for Non-Uniform Cache Architectures," International Conference on Computer Design, Piscataway, 2008.
Jin, et al. "A Domain-Specific On-Chip Network Design for Large Scale Cache Systems," 13th International Symposium on High-Performance Computer Architecture (HPCA-13), Phoenix, 2007.
Office Action in U.S. Appl. No. 12/270,132 mailed on May 23, 2012.
Definition of "systole"; Retrieved from http://www.merriam-webster.com/dictionary/systolic on May 10, 2012.
Final Office Action in U.S. Appl. No. 12/270,132 mailed on Nov. 28, 2012.
Notice of Allowance in U.S. Appl. No. 12/270,132 mailed on Apr. 30, 2013.
Final Office Action in U.S. Appl. No. 13/770,367 mailed on Nov. 19, 2013, 9 pages (pp. 1-9 in pdf).
Notice of Allowance in 12/640,451 mailed on Nov. 14, 2013, 12 pages (pp. 1-12 in pdf).
Notice of Allowance in U.S. Appl. No. 12/640,348 mailed on May 14, 2013, 10 pages (pp. 1-10 in pdf).

TILED STORAGE ARRAY WITH SYSTOLIC MOVE-TO-FRONT ORGANIZATION

CROSS-REFERENCE TO RELATED APPLICATIONS

The present Application is a Continuation of U.S. patent application Ser. No. 12/270,132, filed on Nov. 13, 2008, and issued as U.S. Pat. No. 8,527,726 on Sep. 3, 2013. The present Application claims priority thereto under 35 U.S.C. 120.

BACKGROUND OF THE INVENTION

1. Field of the Invention

The present invention is related to cache memories, and more particularly to a cache memory having a spiral organization in which non-uniform access times are exploited so that most-frequently accessed values have the shortest access times.

2. Description of Related Art

In present-day cache memory systems, there is a trade-off between the time required to access most-frequently-accessed values, and the number of such values available at the shortest access times. For example, in a traditional multi-level cache hierarchy, the level-one (L1) cache provides a uniform access time for a particular number of values, and control circuits and other algorithmic features of some systems operate to maintain the most-frequently-accessed values within the L1 cache. However, due to physical wiring constraints and the fact that electronic systems are limited by the propagation speed of electronic signals, the larger the L1 cache, the longer the (fixed) access time for the typical L1 cache. Similarly, as the size of the L1 cache is reduced in order to reduce the access time, the number of frequently-accessed values that are not stored in the L1 cache increases. The values not stored in the L1 cache are therefore stored in higher-order levels of the memory hierarchy (e.g., the L2 cache), which provides a much greater penalty in access time than that provided by the L1 cache, as the typical cache memory system is inclusive, that is, higher-order levels of the memory hierarchy contain all values stored in the next lower-order level. For practical purposes, a given higher-order cache memory is generally much larger than the cache memory of the next lower order, and given the propagation speed constraints mentioned above, e.g., RC wire delay and the eventual limitation of the inherent speed of electric field propagation in die interconnects, the higher-order cache is much slower, typically on the order of 10-100 times slower than the next lower-order cache memory.

Further, the typical cache control algorithm employed in such cache memory systems typically handles one outstanding request to a cache level at a time. If an access request "misses" a cache, the access is either stalled or fails and must therefore be retried by the source of the request (e.g., a next lower-order numbered cache level or a processor memory access logic in the case of an L1 cache miss). The request is propagated away from the processor toward a higher-order level of cache memory, but retrying requests later at the L1 level ensures that access to the cache is still provided for other instructions that can execute while a hardware thread dependent on the requested value is waiting for the request to succeed. The alternative of stalling the entire processor pipeline is available, but provides an even more severe performance penalty.

Finally, the organization of values in a cache memory hierarchy is typically imposed by control structures within the cache memory hierarchy, e.g., cache controllers, that measure access frequencies according to schemes such as least-recently-used (LRU) and organize the levels of cache to maintain the most-frequently accessed values in the lower-order caches using cast-out logic.

Solutions other than the traditional cache memories and hierarchy described above have been proposed that permit multiple requests to be pipelined, but require the imposition of fixed worst-case access latencies and buffering to control the flow of the pipelined information. Further, non-traditional cache memories have been proposed that have a non-uniform access latency and that are organized without using additional access measurement and cast-out logic, but generally only offer a small potential improvement over the operation of present cache memories by swapping cache entries to slowly migrate frequently accessed values to "closer" locations, while migrating less frequently used values to "farther" locations. Such non-uniform cache memories also require additional pathways to perform the swapping and are typically routed systems, in which switching circuits are used to perform selection of a particular cache bank.

Therefore, it would be desirable to provide a cache memory and method of cache operation that can support multiple outstanding requests, provide very low latency of access for frequently accessed values and that can provide such operation without complicated and area-intensive routing circuits, as well as LRU and cast-out logic.

BRIEF SUMMARY OF THE INVENTION

The invention is embodied in a tiled memory array and method of operation. The tile array has multiple storage locations for storing values, each of which may be a smaller cache memory such as a direct-mapped cache or an associative cache. Movement of values among the multiple storage locations is controlled according to a global systolic clock, which causes requested values to be moved to a front-most tile and further provides that multiple outstanding requests can be maintained "in-flight" within the tile array. The previous value from the front-most location is moved backward in the tile array and may be swapped to the next farther location, whose contents are again swapped backward until either an empty location is reached, or a value is "cast out" of the last (back-most) location.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

Figure 1A:
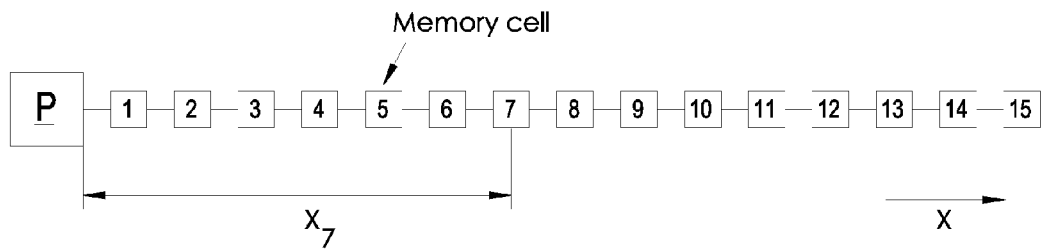
FIGS. 1A-1C are pictorial diagrams illustrating advantages of a placement technique within a spiral cache according to an embodiment of the present invention.

Introduction The present invention encompasses a novel tile array structure and the operation of a tile array structure. The tile array operates according to a systolic move-to-front operation that causes the values in the tile array to be reorganized at each request to place the most-recently accessed value at the front-most central storage location, while moving other values backwards, at each new access, to a location other than the front-most central storage location. The present invention provides large and fast storage by dynamically moving values forward on a substantially continuous basis. The key characteristics of a storage array device according to the present invention are:

1. A tiled architecture of small and fast (e.g. direct-mapped) caches balance wire delay and cache access time at the technological and physical limits;
2. The move-to-front heuristic is used to place and replace storage values dynamically with theoretical guarantees on the maximum access time;
3. N tiles of the storage array behave like an N-way associative cache without the cost of traditional bookkeeping such as least-recently-used (LRU) counters; and
4. The systolic pipeline can keep multiple memory accesses in flight, without routing or switching delays and without requiring data buffering to effect flow control.

While, as mentioned above, systolic architectures for cache memories have been proposed, in those designs, a worst-case access latency is imposed for each value requested, no matter the location in the cache memory. In such designs, requests must travel to the far end of the cache memory, and then traverse each block (or "tile" in the terminology used in the present application) on the way back to the processor or other requestor. The spiral cache memory does not suffer the worst-case latency at each access. Instead, the majority of accesses incur the best-case latency of accessing the front-most tile only, and therefore the spiral cache provides improved performance. Other pipelined memory architectures require internal buffers for controlling the flow of data through a one-dimensional hierarchy of memory tiles. The storage array of the present invention does not require internal flow control buffers, and is not limited to one-dimensional designs. In fact, the storage array of the present invention as embodied in the spiral cache described in the examples below exploits the dimensionality of Euclidean space to reduce the worst-case access latency. A storage array in accordance with an embodiment of the present invention may be viewed as a so-called non-uniform cache architecture (NUCA), which may be implemented as a spiral cache.

Dynamic Cache Placement In order to reduce the access time for frequently-accessed values, and as mentioned above, the storage array of the present invention dynamically self-organizes during accesses to place more frequently-accessed values toward the center of the spiral, and to place less frequently-accessed values toward the outside of the spiral. Signal propagation delays across wires are a primary design constraint for large and fast VLSI designs, and the following illustration is provided to explain the advantages of the memory architecture of the present invention.

A Spatial Memory Model In order to account for wire delays in a memory model, a width can be associated with each cell of a 1-dimensional memory array as illustrated in FIG. 1A. When a processor P issues a load request to storage cell 7, a request signal propagates across storage cells 1 through 6 to storage cell 7, and the data stored in storage cell 7 propagates in the reverse direction back to processor P. In order for a systolic implementation to provide movement between storage cells 1-7, which will be described in further detail as a mechanism for moving values in the spiral cache, signals must travel across one storage cell within one clock cycle. If storage cells 1-7 are implemented as single bit memories, the spatial extent of the illustrated memory array could be tiny and would support a high clock frequency to satisfy the one clock cycle requirement for systolic design. The smaller the memory array, the shorter the propagation delay of a signal traveling across the memory array, and therefore the higher the clock frequency that matches the access latency of the memory array. The access latency of the $i^{th}$ cell is the propagation time of a round-trip from processor P to cell I, which is given by $t_i=2x_i$ or $t_i=2i$ clock cycles under the assumption that a signal traverses the distance of a storage cell within one clock cycle. Therefore, in the illustration, $x_7$, the time required to access storage cell 7 is fourteen clock cycles. In the following description, a spatial-memory model is used to compare placement algorithms for caches.

Placement Algorithms A cache placement algorithm determines the map of program addresses to memory locations, which are generally cache lines. In conventional cache design, a placement algorithm such as least-recently-used (LRU) is used for managing the lines within the same set (also called congruence class) of a set-associative architecture. In the spatial memory model given above, the placement algorithm has a direct impact on the average access latency, even if the entire working set fits into the cache and no evictions occur due to conflict misses. The effect of different placement algorithms on the average access latency can be observed using a sample access trace:

load A, load B, load C, load C, load B, load B.

Figure 1B:
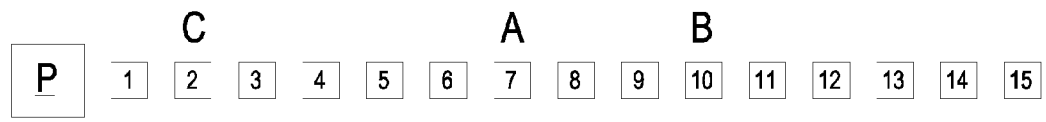

The simplest cache placement algorithm, variations of which are employed in direct-mapped cache design, interprets the least significant bits of a line address as the index of the cache line. Referring now to FIG. 1B, an example is given in which the mapping from addresses to memory cell indices, in which the value for address A is stored in storage cell 7, the value for address B is stored in storage cell 10 and the value for address C is stored in storage cell 2. It is noted that the above mapping precludes any control over the distance of the placement of the values from the processor. The effectiveness of the placement algorithm can be evaluated by computing the average access latency of the sample access trace. Assuming that the cache is initially empty, the first access due to instruction load A requires a backing store access, the loaded value corresponding to address A is stored in storage cell 7, and then incurs $t_7=14$ clock cycles of cache access latency. The next two load instructions load B and load C also require backing store accesses, whereas the remaining three instructions are served directly out of the cache. The access latencies (in cycles) are given below in Table I.

TABLE I

| instruction | load A | load B | load C | load C | load B | load B |
|---|---|---|---|---|---|---|
| access latency | 14 | 20 | 4 | 4 | 20 | 20 |
| backing store access | yes | yes | yes | no | no | no |

The total number of clock cycles consumed by access latency is 82, in addition to the cycles required for three backing store accesses. The average access latency, not counting the backing store accesses, is hence 82/6=13.7 cycles per access.

Figure 1C:
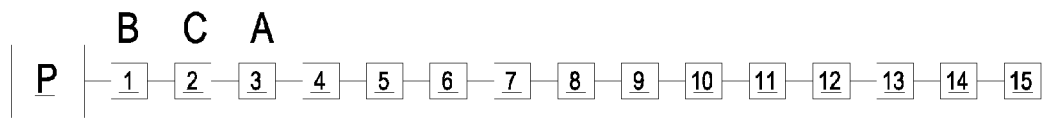

A more effective placement algorithm can be implemented by mapping addresses into storage cells 1-15 according to the frequency of accesses to the values corresponding to the addresses. The most frequently accessed value would be stored closest to processor P to minimize the average access latency. In the sample access trace, the most frequently accessed address is B, which is accessed three times. Hence, the value for address B should be stored in storage cell 1. The second most frequently accessed value is at address C, which should be stored in storage cell 2 and the third most frequently accessed value at address A would then be stored in storage cell 3, as illustrated in FIG. 1C. Analogous to the accounting of access latencies shown in Table I above, Table II below summarizes the access latencies for the cache value placement illustrated in FIG. 1C.

TABLE II

| instruction | load A | load B | load C | load C | load B | load B |
|---|---|---|---|---|---|---|
| access latency | 6 | 2 | 4 | 4 | 2 | 2 |
| backing store access | yes | yes | yes | no | no | no |

The sum of the access latencies in Table II is 20 clock cycles, and the average access latency is 20/6=3.33 clock cycles per access. Thus the average access latency of the direct-mapped placement illustrated in FIG. 1B, at 13.7 cycles per access, is more than four times larger than the placement based on access frequency illustrated in FIG. 1C.

Unfortunately, the access frequency of the trace of a program is generally not known in advance. However, there exists an on-line placement strategy that is provably within a factor of 2 of the best off-line strategy, known as "move-to-front." The move-to-front strategy moves each requested value to the front of the array. To make space for a new value in the front of the array, the value currently stored in the front of the array is pushed back towards the tail of the array. Since the placement of the values (e.g., cache lines) is dynamic, each value must be searched at subsequent accesses.

Figure 2:
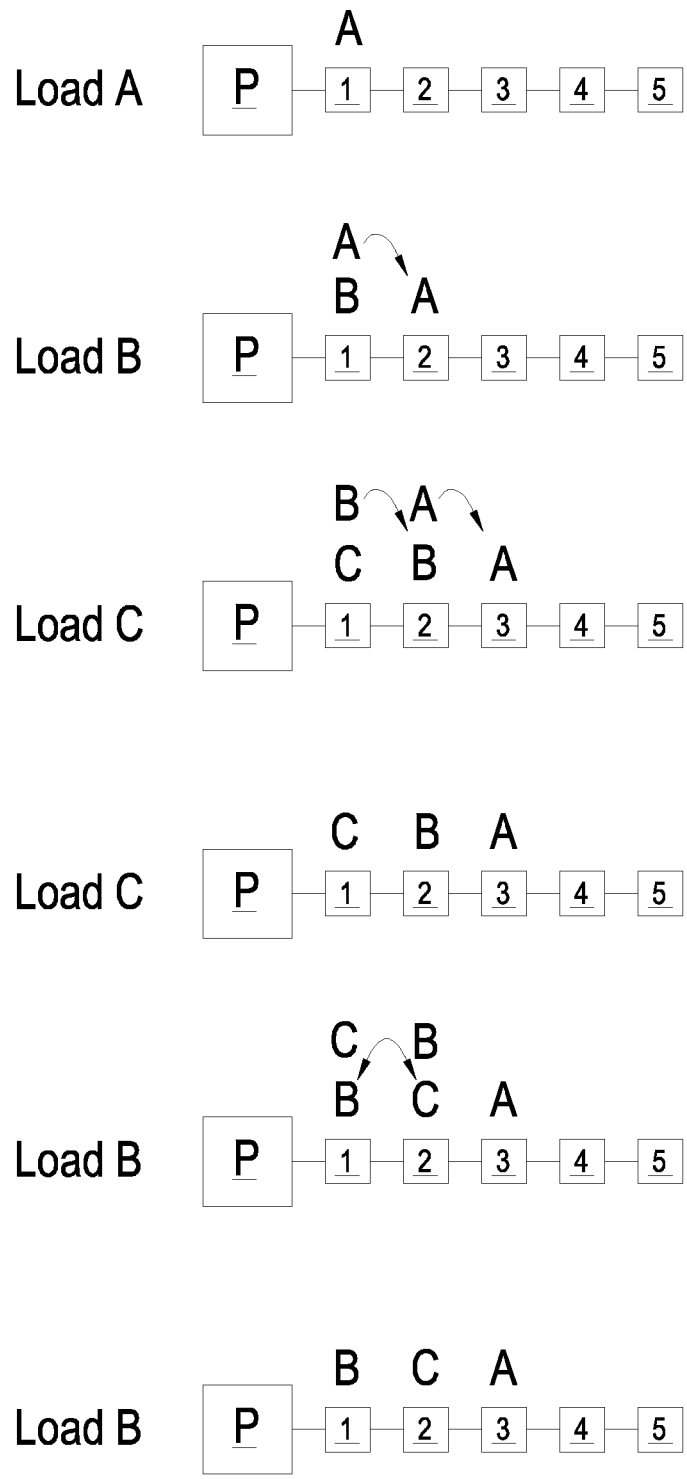
FIG. 2 is a pictorial diagram illustrating dynamic re-arrangement of values within a spiral cache according to an embodiment of the present invention.

Referring now to FIG. 2, the placement of values according to their addresses by a move-to-front heuristic is shown. Unlike the static placements illustrated in FIG. 1B and FIG. 1C, the dynamic placement of FIG. 2 adapts the mapping to the access pattern of a program's trace during execution. The first three load instructions fetch the values from memory according to addresses A, B and C and move the associated data into front-most storage cell 1 at each access. Then, the second load at address C finds the requested value (i.e., finds an address match to C) in storage cell 1, incurring the minimum access latency of 2 clock cycles. Next, the second access at address B moves the requested value (along with its address) from storage cell 2 into front-most storage cell 1, effectively swapping the contents of front-most storage cell 1 with the contents of storage cell 2. The final access at address B finds the requested value in cell 1, causing the minimal access latency of 2 clock cycles. Table III, below, shows the access latencies for the placement scheme of FIG. 2.

TABLE III

| instruction | load A | load B | load C | load C | load B | load B |
|---|---|---|---|---|---|---|
| access latency | 2 | 2 | 2 | 2 | 4 | 2 |
| backing store access | yes | yes | yes | no | no | no |

The sum of the access latencies is 14 clock cycles, and the average access latency is 14/6=2.3 clock cycles per access. Ignoring the accesses to main memory, it is noteworthy that the move-to-front heuristic produces an even smaller average access latency than the placement based on access frequency, even though the access-frequency placement is based on the knowledge of the entire trace, whereas the move-to-front placement considers one access at a time only.

The Move-to-Front Heuristic The move-to-front heuristic has been shown to be 2-competitive in the context of maintaining a list, in that, move-to-front is, to within a constant factor, as efficient as any algorithm, including those based on knowing the entire sequence of operations. The move-to-front heuristic enables the spiral cache to be organized, such that the total access latency due to load, store, or eviction operations is no worse than twice the access latency incurred by any algorithm that has complete knowledge about the entire trace. The spiral cache of the present invention implements a placement algorithm based on the move-to-front heuristic. Its 2-competitiveness provides a bound on the access latency of this implementation, and therefore provides a theoretical guaranteed limit on access latency.

Architecture of a Spiral Cache A spiral cache according to an embodiment of the present invention, exploits the dimensionality of Euclidean space to reduce the worst-case access latency, and offers a systolic data flow capable of pipelining multiple accesses. In the following illustrative embodiment the storage cell associated with a tile of a spiral cache is itself an entire storage array. In general, an efficient tile design balances the size of the tile's array such that the propagation delay of the wires connecting neighboring tiles is equal to the access latency of the tile's array. One embodiment of the spiral cache uses a fast, direct-mapped cache within each tile, and uses a cache line as the unit of data transfer between the tiles. In the present application, the memory within a tile is referred to as the memory array irrespective of the particular cache architecture and physical layout that are employed in the tiles. The tiles further provide the movement functionality in the illustrated embodiment as described below according to a distributed control logic provided by control logic of the individual tiles, although in an alternative embodiment, global control logic may be used to control the information flow.

Figure 3:
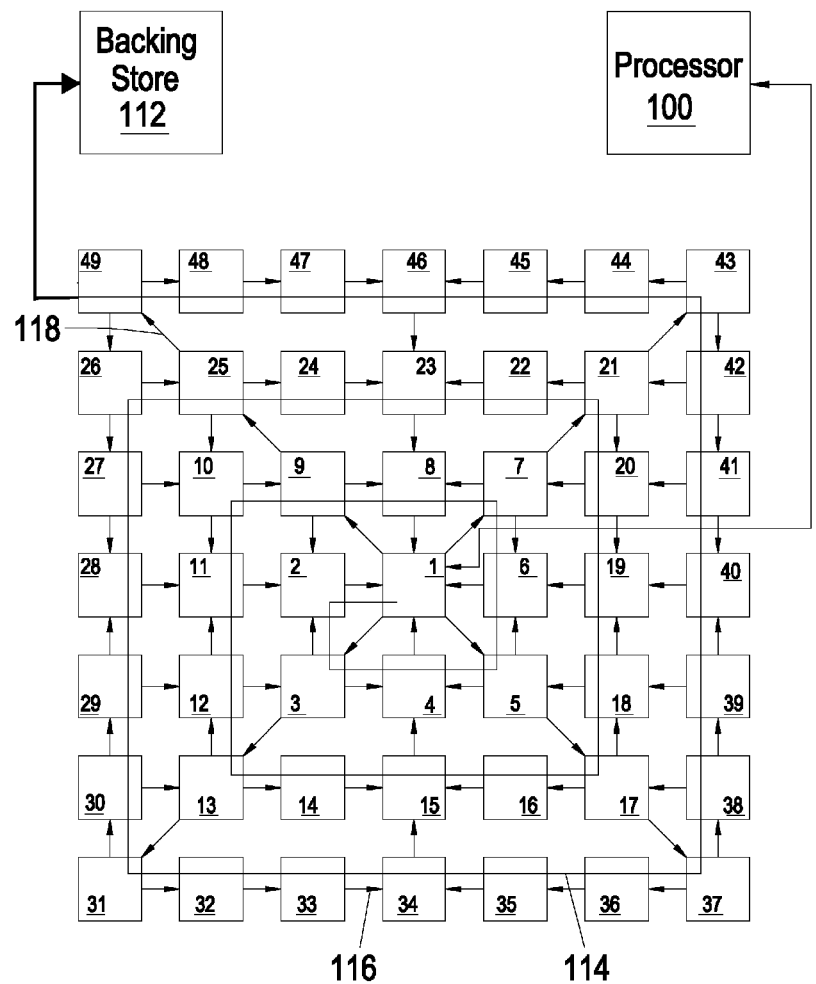
FIG. 3 is a block diagram of a spiral cache according to an embodiment of the present invention.

Basic Spiral Cache Architecture The basic architecture of a 2-dimensional spiral cache in accordance with an embodiment of the present invention is shown in FIG. 3. The spiral nature of the exemplary cache can be visualized as a "wrapping" of the linear array of FIG. 1A around tile 1, such that the linear array now forms an Archimedes spiral with a Manhattan layout. A processor 100, lower-order cache, or other data/instruction sink connects to the front end of the spiral at front-most tile 1. The tail end of the spiral, in the example at tile 49 of the 7×7 matrix of tiles, connects to a backing store 112, which may be a higher-order cache, system memory, disc storage or other data/instruction storage. Before discussing the interconnect network(s) illustrated in FIG. 3, it is useful to describe in more detail the operation of a simpler linear array. When implementing the move-to-front based placement algorithm on the linear array in FIG. 1A, two functionalities are required: (1) move data to the front; and (2) push data back to make space for an item that is moved to the front. For example, consider the second load instruction for address B in FIG. 2. The address-to-cell mapping prior to executing the second load B instruction is C→1, B→2, A→3. To move the value corresponding to address B to the front, the array must be searched for B by scanning the array from the front. When address B is found in storage cell 2, the associated data are communicated towards the processor, leaving storage cell 2 empty. When the value corresponding to address B arrives at front-most storage cell 1, front-most storage cell 1 is "freed" by swapping the value corresponding to address C with the value corresponding to address B. Then, the value corresponding to address C is communicated towards the tail end of the spiral until an empty cell is encountered. In the example, storage cell 2 is free to accommodate the value corresponding to address C. In general, storage cell contents are continually swapped backwards toward the tail, effectively pushing back the existing contents of the storage cells until an empty cell is encountered or the value stored at the tail end is swapped out into backing store 112.

For the spiral cache illustrated in FIG. 3, the spiral network 114 of next neighbor connections is dedicated to the push-back operation. Doing so enables the spiral cache to move one new data item into front-most tile 1 during every systolic cycle, because a fully occupied spiral cache can perform one push-back swap of the contents of each storage cell in each systolic cycle. Details of the systolic cycle in the spiral cache of the present invention are provided hereinafter below in the section entitled Systolic Design. In essence, swap-back and move-forward data arriving at a tile are automatically directed according to the flow patterns described in further detail below. Tiles at edges of the spiral cache array (i.e., the storage cells in the outer turn of the spiral) have any ports that extend toward the outside of the spiral terminated by appropriate circuitry, so that a single tile design can provide all of the functionality of move-to-front and swap backward according to the global clock that provides the systolic pulse operating the spiral cache as described below.

To support the search for and communication of a requested value to front-most tile 1, a second network is provided, a grid-style move-to-front network 116 of next neighbor connections as indicated by the horizontal, vertical and diagonal arrows in FIG. 3. From a high-level perspective the operation of the move-to-front network is straightforward. For example, when processor 100 requests a value that is stored in tile 49, the processor issues the request at front-most tile 1. The request travels along a diagonal path 118 toward (corner) tile 49. The requested value is found in tile 49, and the value (along with the value's address and flags) moves to front-most tile 1 in an xy-routing pattern via tiles 48, 47, 46, 23, 8, in the specified order. Defining P(a,b,c, d . . . ) as a path of transfer of values from tiles a to b, b to c, c to d, and so forth, it is noted that the travel time along path P(1,9,25,49,48,47, 46, 23,8,1) involves 10 hops, or 10 cycles according to the spatial memory model described above. The analogous access latency in a linear array of 49 tiles would be $t_{49}=2\times49=98$ cycles. Thus, the 2-dimensional spiral organization reduces the access latency approximately according to the square root of the linear access time for an "un-wrapped" spiral. In general, a k-dimensional spiral having N tiles has a worst-case access latency of $\theta(N^{1/k})$. Worst-case access latency as used herein refers to the latency of accessing a tile with the largest Manhattan distance from tile 1.

Geometric Retry A k-dimensional spiral cache with N tiles reduces the worst-case access latency compared to a linear array from $\theta(N)$ to $\theta(N^{1/k})$. The move-to-front heuristic acts to compact the working set at the front of the spiral, and keeps the most frequently accessed data items near front-most tile 1. The above property cannot be exploited with a search strategy that performs a lookup at each tile, because this would require broadcasting each request to the outer boundary of the cache which incurs the worst-case access latency. Instead, the illustrated spiral cache, in accordance with an embodiment of the present invention, implements a search strategy with a best-case access latency of $\theta(1)$ if the request "hits" in (i.e., the requested value is located in) front-most tile 1. Since the values stored in the spiral cache are moved according to the move-to-front placement algorithm described above, processor 100 does not have information specifying a tile where a particular value is stored. Therefore, each access causes a search for the value that corresponds to an address. Rather than look-up the location of the value in a table, such as is typically performed in a conventional associative cache memory, in the spiral cache of the depicted embodiment of the invention, the look-up is performed at each storage cell, by propagating the request to the storage cells, and then returning the requested value from the storage cell at which the requested value is found. According to the assumptions underlying the move-to-front competitiveness result for a linear array given above, a search should scan the tiles from front-most tile 1 towards the tail end of the spiral at backmost tile 49. In a 2-dimensional spiral as illustrated in FIG. 3 the tile array is scanned in a radial fashion. First, a check is performed to determine whether the requested value is stored in front-most storage cell 1. If the value is not located in front-most storage cell 1, the "ring" of radius 2 consisting of tiles 2-9 is checked. If the value is also not found in tiles 2-9, the ring of radius 3 formed by tiles 10-25 is checked and so forth, scanning the tiles on rings with increasing radius. The outwardly propagating request is handled by the tiles making copies of received requests when the address specified in the requests is not found in the tile. In the present disclosure, the terms "ring" and its "radius" are used loosely, referring to their conformal square maps in the Manhattan layout. However, it is understood that similar concepts apply in layouts that differ from a Manhattan layout, and the present invention is not limited to a particular square layout or a layout of another shape or necessarily to a spiral arrangement, as the move-to-front and push-backward functionality of a storage device in accordance with the present invention may be provided by other layouts in accordance with alternative embodiments of the invention.

Figure 4A:
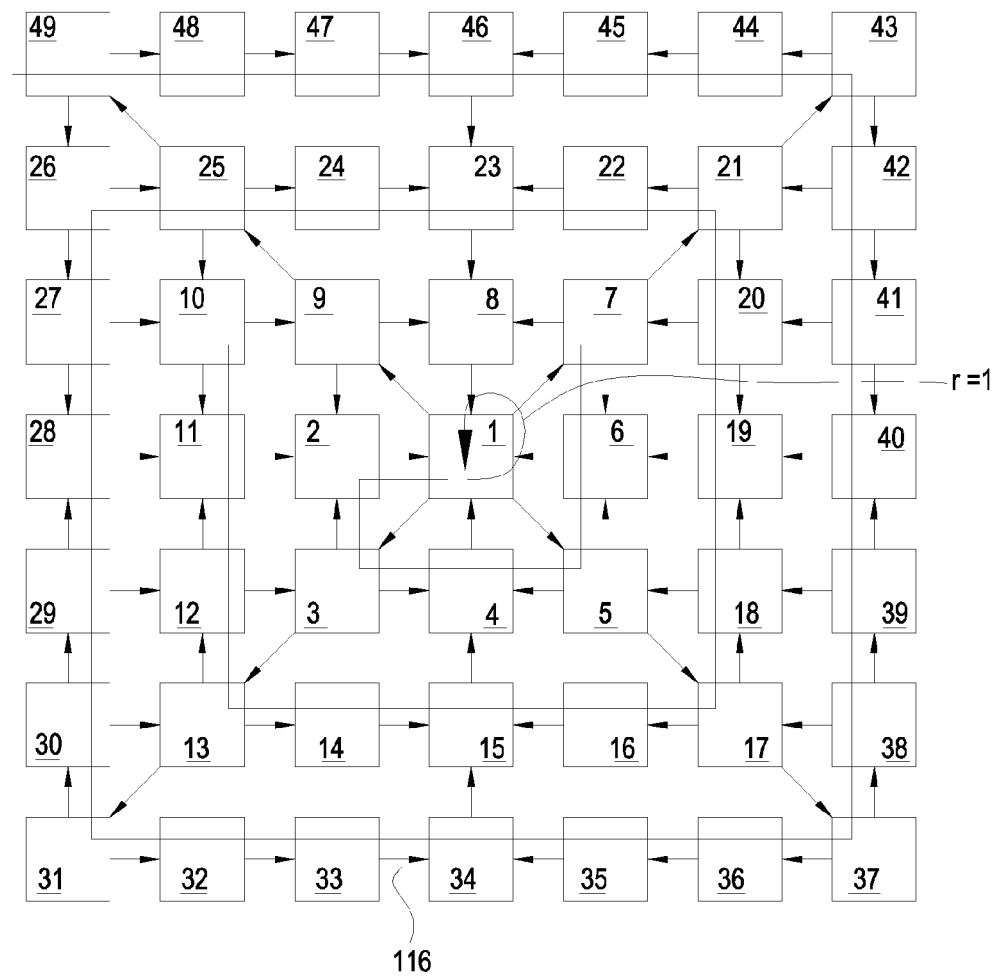
FIGS. 4A-4C are block diagrams illustrating geometric retries within the spiral cache of FIG. 3.
Figure 4B:
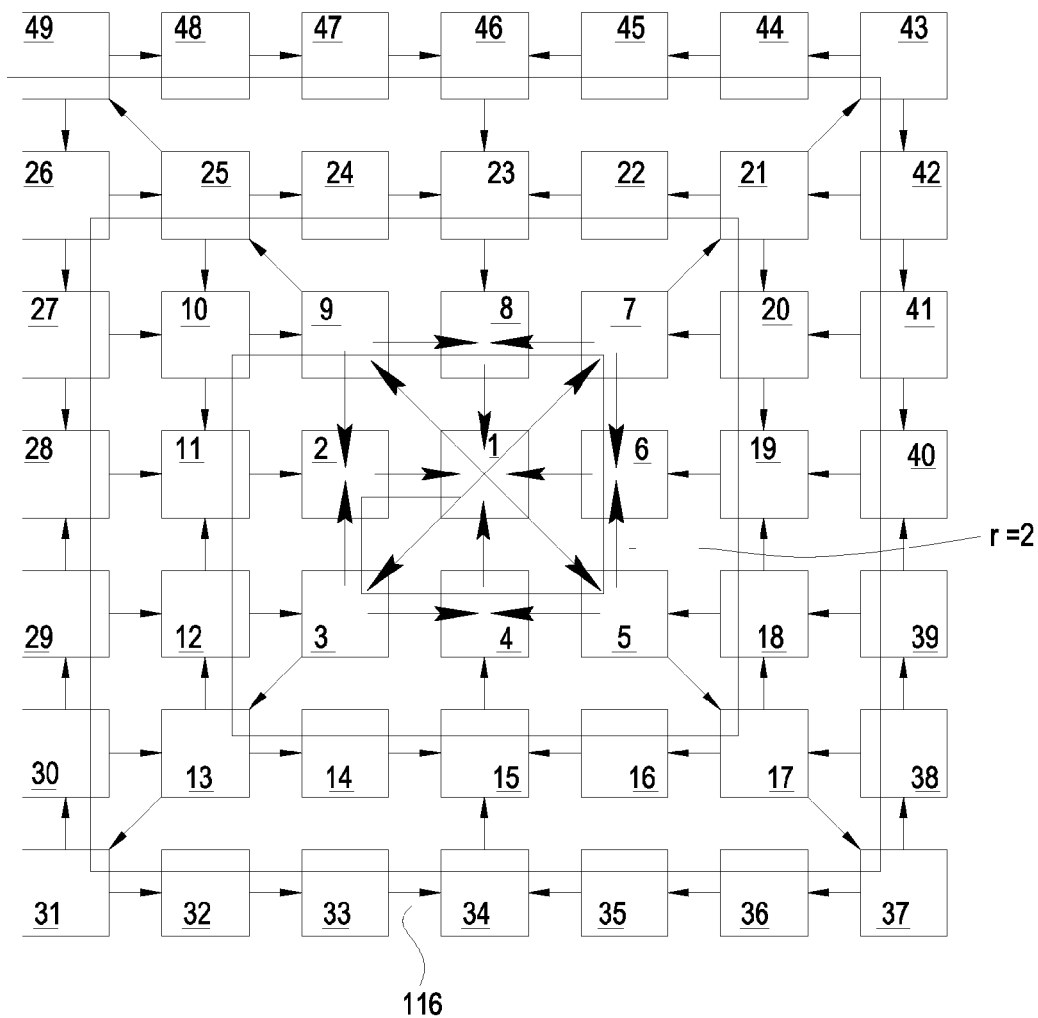
Figure 4C:
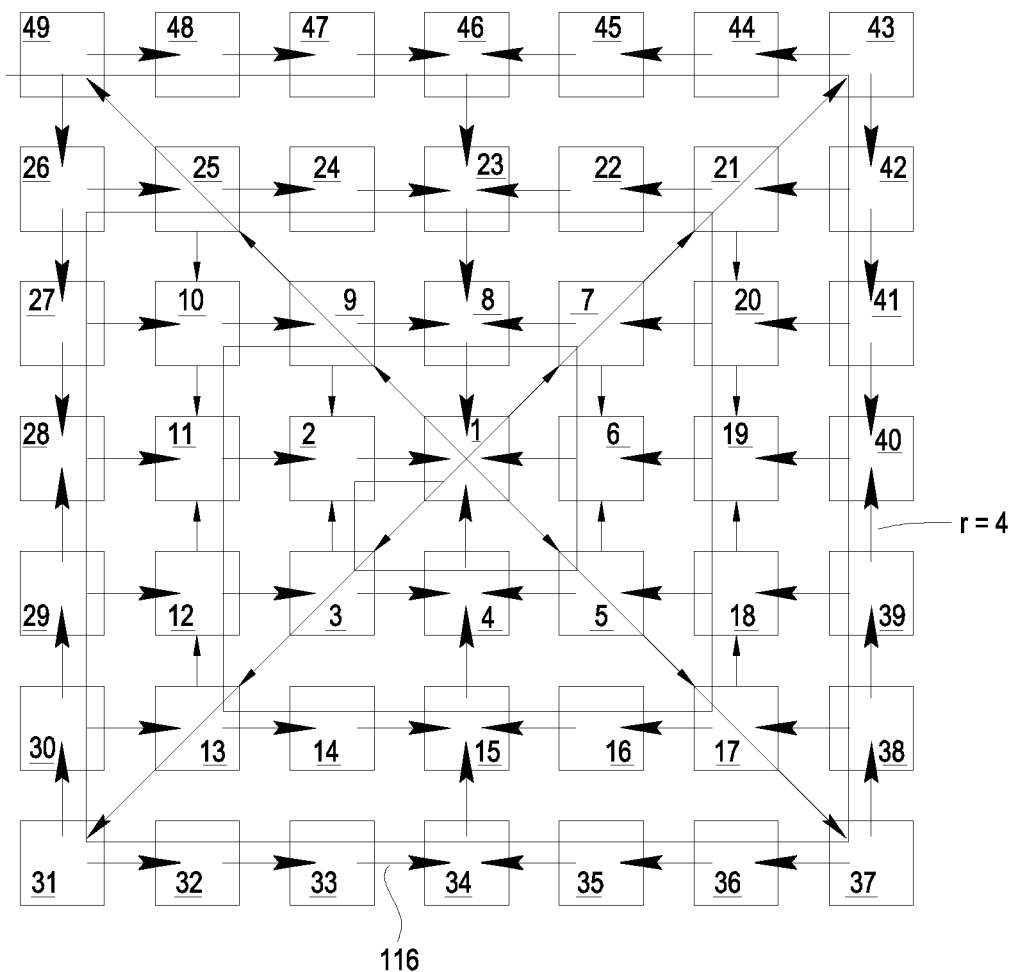

An advantage of the scanning search strategy in the spiral cache of the present embodiment is that it produces a best-case access latency of 1 cycle whenever the requested address is found in tile 1. Due to the move-to-front strategy, this best-case scenario should be achieved frequently. One problem encountered in such a scanning search strategy is the unpredictable flow of values that are moving toward front-most tile 1 when multiple access requests are in flight simultaneously. In order to avoid providing internal buffering and flow control mechanisms, which incur an unnecessary circuit area, circuit power and delay penalty, in accordance with an embodiment of the present invention, a different search strategy may be employed based on the principle of geometric retry. FIGS. 4A-4C illustrate how the move-to-front network 116 supports a search strategy with geometric retry in accordance with an embodiment of the present invention, which operates according to the following principle: "if an item is not found in the area of radius $2^s$, retry the search in the area with radius $2^{s+1}$." FIG. 4A illustrates the procedure for initial radius $2^0=1$ (r=1), which represents the lookup in front-most tile 1. If the lookup in front-most tile 1 fails, all tiles within radius $2^1=2$, (i.e. (tiles 2-9 for r=2) are searched, and also front-most tile 1 is searched again at radius 1, as illustrated in FIG. 4B. If the search fails again, the search radius is again doubled to $2^2=4$, which covers the entire spiral cache (i.e., tiles 1-49 for r=4) as illustrated in FIG. 4C. If the search of the entire spiral cache fails, the requested value is not in the cache and processor 100 must access backing store 112 to fetch the requested value.

The data flow through the spiral cache during a scanning search is illustrated in FIGS. 4A-4C by the large arrows. The particular search case with retry radius $2^0=1$ is trivial, and retry radius $2^1=2$ is a smaller version of the larger scenario exhibited by retry radius $2^2=4$. The communication pattern for only the top right quadrant in FIG. 4C will be described below, as the other quadrants operate analogously and are searched simultaneously. A central principle of the request data flow in a spiral cache in accordance with the illustrated embodiment of the invention, is that requests can and will be copied, and multiple copies of any given request will be in-flight within the spiral cache array, unless the request is satisfied immediately with a look-up in front-most tile 1. A copy of the request is sent to each of the quadrants on each retry and requests can be further copied within the quadrants, as will be described in further detail below. A request propagates from front-most tile 1 outwards along a diagonal path to tile 43 in the top right corner of the spiral cache. At tile 43, the request is simultaneously sent in a direction leftward in the Figure to tile 44 and downward to tile 42, and therefore two copies of the request are generated from one original copy of the request. The leftward communication path continues until tile 46 is reached, and then turns downward toward front-most tile 1. The downward path is followed until tile 40 is reached, where the request is directed to the left toward front-most tile 1. In each of the tiles on the downward path, a left-directed path is split off by sending a copy of the request to the left. From tile 42, the left-directed path traverses tiles 21 and 22, and is then directed downward at tile 23. From tile 41, the left-directed path traverses tiles 20 and 7, and is directed downward at tile 8. In the above-described path traversal, each tile of the quadrant is visited, and a lookup is performed with the address provided with the request.

The geometric retry employed in the illustrated embodiment does not change the asymptotic bounds due to move-to-front or due to the dimensionality of the spiral. It merely introduces constant factors. More explicitly, the following principles hold:

1. Geometric retry at most doubles the worst-case access latency.
2. Geometric retry succeeds to find an item within a factor of 4 of the scan access latency.

These statements are straightforward to prove and carry over to higher-dimensional spiral caches as well.

Figure 5:
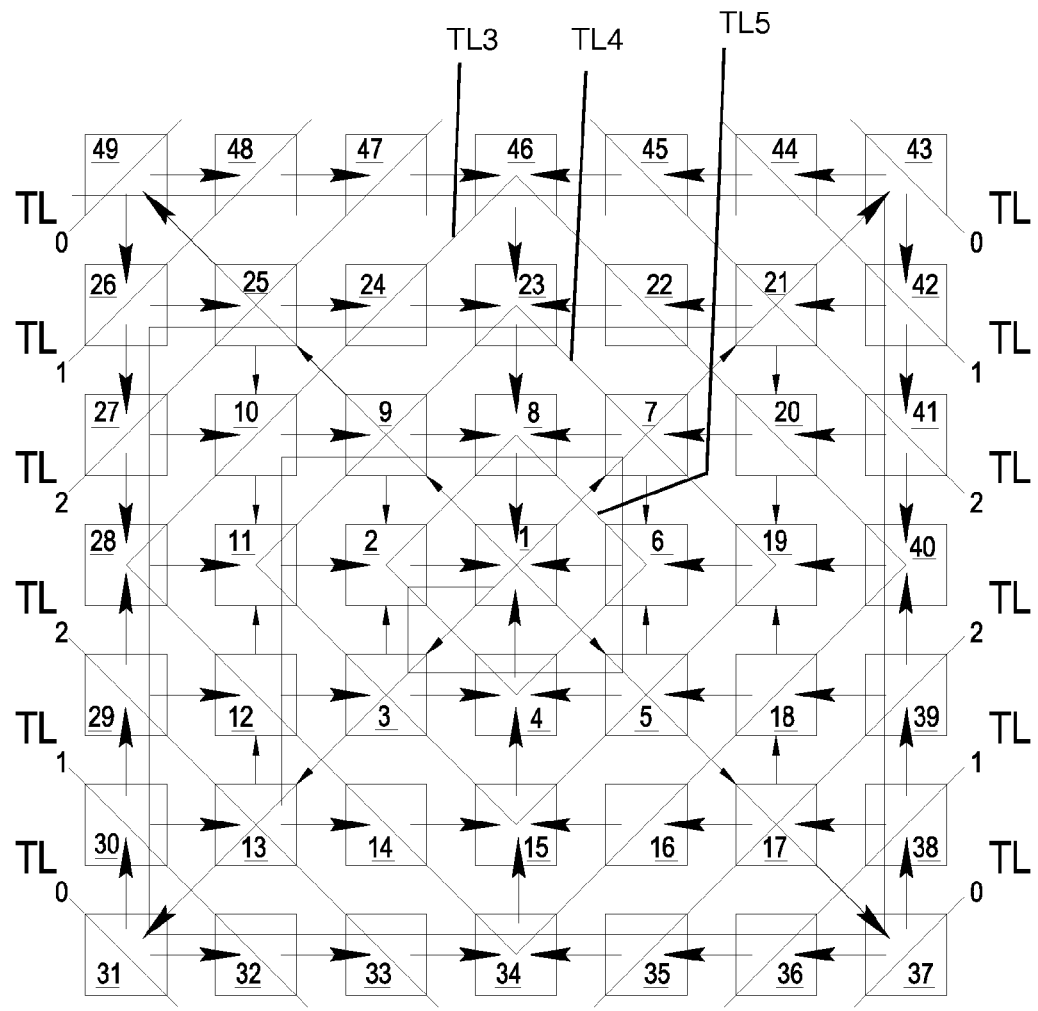
FIG. 5 is a block diagram of the spiral cache of FIG. 3, showing systolic timelines of data flow during operation.

Systolic Design The basic spiral architecture augmented with the geometric retry mechanism can be extended into a systolic architecture in accordance with an embodiment of the invention, providing both low access latency and high throughput at the same time. A timeline is defined as is a subset of tiles that receive a copy of one request for a particular value (i.e. a request containing one address) at the same time. FIG. 5 shows timelines TL0-TL5 that a request traverses from the corners of the cache boundary towards front-most tile 1. Assuming that a request has travelled along the diagonals to corner tiles 49, 43, 37, and 31, at the leftmost and rightmost boundary tiles, the request is duplicated into a horizontally-directed copy and vertically-directed copy as described above. Assuming that a request reaches the corner tiles during cycle 0, it reaches the tiles specified on the timelines TL1 for cycle 1 next. For example, the request in the top left corner tile 49 reaches tiles 26 and 48 during cycle 1. This communication pattern repeats up to timeline TL3, where multiple incoming requests are present at tiles 46, 40, 34, and 28. Note that the requests arriving at each of these tiles must bear the same address, due to the timing of the requests, the point of generation of request copies and the directing of the requests. Similarly, tiles 23, 8, 1, 4, and 15 operate in a conflict-free manner, because each of multiple incoming requests carries the same address during a cycle, and the tiles pass this address along to the neighboring tile connected to their output. In case of tile 1, the output is the processor.

The above-described data flow is conflict-free because a spiral cache with move-to-front placement stores the data associated with each address in at most one tile. Either the address is not in the spiral cache at all or it is mapped to (and it's value stored in) exactly one tile. Thus, at most one of the requests can "find" data in a tile, and move the retrieved data to front-most tile 1. Each of the tiles having multiple inputs either passes the already retrieved data from one of its inputs to an output directed towards front-most tile 1, or receives the same address on each of the inputs, performs a local lookup, and, in case of a hit, retrieves and passes the data or, in case of a miss, passes the address on to the front-directed output. A systolic data flow enables the pipelining of multiple requests. Each request is sent from front-most tile 1 via the diagonal paths to the corner tiles of the array, and the request moves via timelines TL0-TL5 back to front-most tile 1. Viewing each tile on the diagonal paths and each timeline TL0-TL5 as a pipeline stage, the 7×7 spiral cache in FIG. 5 has effectively 10 stages. The illustrated spiral cache generates a throughput of one request per cycle, and maintains 10 requests in flight. In general, an N×N spiral cache with odd N has $\lceil N/2 \rceil + 2\lfloor N/2 \rfloor$, or approximately 3/2N, pipeline stages.

To obtain a throughput of one request per cycle in the presence of geometric retry, one additional feature is needed. When a tile on the diagonal receives both of: 1) a new request having a retry radius equal to the diagonal tile's radius; and 2) a returning request on the way back to front-most tile 1 during the same cycle, the returning request must have priority. Otherwise, the systolic pattern of requests traveling along the timelines would be destroyed. Rather than abandoning the new request, it is sent outwards on the diagonal paths with an incremented retry radius. This forwarded request can turn toward the front when it encounters a bubble (gap) in the pipeline of timelines TL4, TL2, and TL0 on the diagonal tiles. If there is no bubble available, the request will travel to the corners on the boundary associated with timeline TL0, where it is guaranteed by structural and functional design to return without conflict toward the front.

Figure 6:
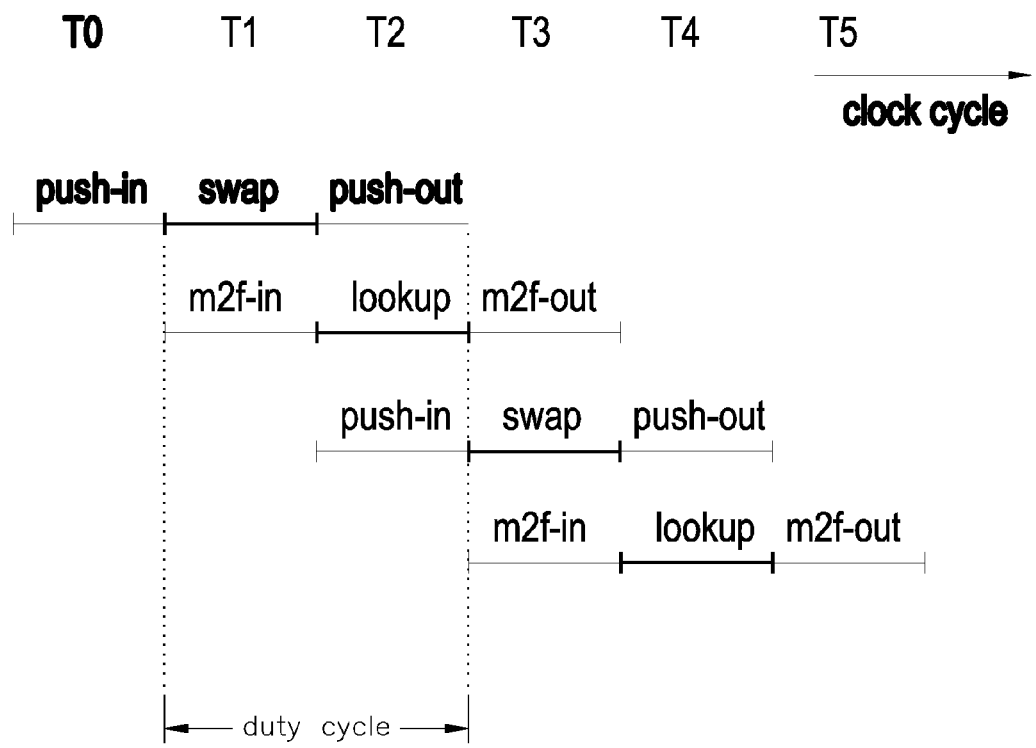
FIG. 6 is a timing diagram illustrating cache micro-operations within the spiral cache of FIG. 3.

In order to perform the above-described operations, the move-to-front and push-back accesses within the tiles must be scheduled. Since the systolic design of the spiral cache in the illustrative embodiment permits one move-to-front lookup operation and one push-back operation per cycle, in a spiral cache in accordance with one embodiment of the present invention, a micro-pipeline with a duty cycle consisting of two clock cycles is included. During the first clock cycle T1, a swap operation swap is performed as part of the push-back functionality, storing input data push-in provided by push-back network 114 and providing the contents of the tile (if non-empty) as output data push-out on push-back network 114. During the second clock cycle T2, a cache lookup lookup is performed to implement the search functionality associated with a request m2f-in moving to the front and moving the request forward on move-to-front network 116 as request m2f-out, populating the data area associated with the request and setting flags if the lookup succeeded. FIG. 6 illustrates the pipelining of cache accesses and next-neighbor communications from the perspective of one tile. A swap operation is incorporated in the illustrative spiral cache tile array design, which: (1) applies the push-back address, (2) reads the cache contents, and (3) writes the push-back data, which can be performed within one clock cycle to meet the two-cycle operation described above, and may include time-borrowing techniques to provide such operation. If a swap operation cannot be practially implemented in a particular design, the swap can be implemented by a one-cycle write operation performed after a one-cycle read operation, and extending the duty cycle of the micro-pipeline to three clock cycles.

Tiled memory arrays according to other embodiments of the present invention may be implemented using different geometries to yield cache designs having different tradeoffs of dynamic value movement and the proximity of most-recently-used values to the front-most tile. For example, rather than swapping each non-accessed value backward at each access, other heuristics may be applied, including those conditioned on most-recently-used (MRU) counters or other strategies, as long as requested values are always moved to the front-most tile. In the spiral applications described above, there are advantages to the particular spiral cache architectures that are related to its ability to keep the most recently used values in close physical proximity of the processor (or other data sink) for as long as possible. The move-to-front heuristic ensures that access latencies of recently used values remain small, while the swap-backward heuristic ensures that recently used values are not moved farther from the processor than is necessary.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A storage circuit, including:
   multiple storage tiles corresponding to a single level of storage access that provides for arbitrary access to any one of the multiple storage tiles, wherein values stored within the storage circuit are associated with unique corresponding ones of the multiple storage tiles, and wherein a particular one of the multiple storage tiles is a front-most tile having an interface connection at which responses to read access requests directed at any of the multiple storage tiles are provided to a requesting device from a storage within the front-most tile; and
   control logic for accessing the values within the multiple storage tiles, wherein the control logic moves the values among the multiple storage tiles according to a placement heuristic in response to an access to one of the multiple storage tiles while maintaining the uniqueness of the values within the multiple storage tiles to move a requested value to the front-most tile, and wherein the control logic further moves the values among the multiple storage tiles according to a global clock, whereby multiple move-to-front operations are simultaneously maintained in-progress among the multiple storage tiles.

2. The storage circuit of claim 1, wherein the front-most tile further receives all write requests to the storage circuit, wherein the control logic writes supplied values corresponding to the write requests only to the front-most tile in response to the write requests.

3. The storage circuit of claim 2, wherein the control logic writes the supplied values to the front-most storage tile only after a corresponding previous value has been moved to the front-most storage tile, whereby uniqueness of the values in the single level of storage access is preserved.

4. The storage circuit of claim 1, wherein the storage tiles each contain multiple storage locations.

5. The storage circuit of claim 1, wherein the storage tiles are cache memories.

6. The storage circuit of claim 1, wherein the front-most storage tile has a first access latency in response to access requests, and wherein the placement heuristic moves a value previously stored in the front-most storage tile to another one of the multiple storage tiles that has a second latency in response to an access request, wherein the first access latency is lower than the second access latency.

7. The storage circuit of claim 1, wherein the control logic is distributed at the storage tiles, and implements the placement heuristic by the response of the storage tiles to requests received at the storage tiles.

8. The storage circuit of claim 7, wherein the control logic is provided as an identical control logic within each storage tile, wherein the placement heuristic is implemented by the identical control logic of each storage tile according to the position of each storage tile within an array formed by the multiple storage tiles.

9. The storage circuit of claim 7, wherein the global clock controls movement of access requests and movement of the values between the storage tiles along an information pathway formed only by connections between adjacent ones of the multiple storage tiles within an array formed by the multiple storage tiles.

10. A method of providing access to a plurality of values within a storage device, comprising:
    storing the plurality of values in multiple storage tiles forming a single level of storage access, wherein the storing stores the plurality of values in unique corresponding ones of the multiple storage tiles;
    in response to an access request implicating one of the plurality of values, moving the requested value to a front-most one of the multiple storage tiles according to a global clock and a placement heuristic that maintains the uniqueness of the values within the multiple storage tiles, wherein the front-most storage tile has an interface at which values returned in response to read requests directed to any of the multiple storage tiles are provided to a requesting device from the storage within the front-most tile;

moving a displaced value from the front-most storage tile backwards according to the global clock, wherein multiple move-to-front operations are simultaneously maintained in-progress among the multiple storage tiles.

11. The method of claim 10, further comprising:
receiving write requests at the front-most storage tile; and
writing values supplied with the write requests only to the front-most tile in response to the write requests.

12. The method of claim 11, further comprising in response to the write requests, moving previous ones of the values associated with addresses corresponding to addresses provided by the write requests to the front-most storage tile, and wherein the writing is performed only after a corresponding previous value has been moved to the front-most storage tile, whereby uniqueness of the values in the single level of storage access is preserved.

13. The method of claim 10, wherein the storage tiles each contain multiple storage locations.

14. The method of claim 10, wherein the storage tiles are cache memories, and wherein the access request is a cache access request.

15. The method of claim 10, wherein the front-most storage tile has a first access latency in response to access requests, and wherein the placement heuristic moves a value previously stored in the front-most storage tile to another one of the multiple storage tiles that has a second latency in response to an access request, wherein the first access latency is lower than the second access latency.

16. The method of claim 15, wherein the moving is performed by operation of the storage tiles, wherein the placement heuristic is implemented by the response of the storage tiles to requests received at the storage tiles.

17. The method of claim 16, wherein the operation of each storage tile in response to the requests is identical at each storage tile, wherein the placement heuristic is implemented according to the position of each storage tile within an array formed by the multiple storage tiles.

18. The method of claim 16, wherein the global clock controls movement of access requests and movement of the values between the storage tiles along an information pathway connecting the storage tiles only to adjacent tiles within an array formed by the multiple storage tiles.

19. A processing system, comprising:
a processor for executing program instructions and operating on data values; and
a cache memory for caching values including at least one of the program instructions or the data values, wherein the cache memory is formed by multiple storage tiles corresponding to a single level of storage access that provides for arbitrary access to any one of the multiple storage tiles, wherein values stored within the storage circuit are associated with unique corresponding ones of the multiple storage tiles, and wherein a particular one of the multiple storage tiles is a front-most tile having an interface connection at which responses to read access requests directed at any of the multiple storage tiles are provided to a requesting device from a storage within the front-most tile, and control logic for accessing the values within the multiple storage tiles, wherein the control logic moves the values among the multiple storage tiles according to a placement heuristic in response to an access to one of the multiple storage tiles while maintaining the uniqueness of the values within the multiple storage tiles to move a requested value to the front-most tile, and wherein the control logic further moves the values among the multiple storage tiles according to a global clock, whereby multiple move-to-front operations are simultaneously maintained in-progress among the multiple storage tiles.

20. The processor of claim 19, wherein the front-most tile further receives all write requests to the storage circuit, wherein the control logic writes supplied values corresponding to the write requests only to the front-most tile in response to the write requests.

* * * * *